(12) United States Patent
Gajda et al.

(10) Patent No.: US 10,913,379 B2
(45) Date of Patent: Feb. 9, 2021

(54) RETENTION DEVICE FOR VEHICLE SEAT

(71) Applicant: Ford Global Technologies, LLC, Dearborn, MI (US)

(72) Inventors: Lukasz Gajda, Royal Oak, MI (US); N. R. Adarsh Gupta, Southgate, MI (US); Leo Tognetti, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 16/296,984

(22) Filed: Mar. 8, 2019

(65) Prior Publication Data

US 2020/0282877 A1 Sep. 10, 2020

(51) Int. Cl.
*B60N 2/427* (2006.01)
*B60N 2/70* (2006.01)
*B60N 2/42* (2006.01)

(52) U.S. Cl.
CPC ....... *B60N 2/42718* (2013.01); *B60N 2/4221* (2013.01); *B60N 2/42709* (2013.01); *B60N 2/7017* (2013.01)

(58) Field of Classification Search
CPC .......................... B60N 2/42718; B60N 2/7011
See application file for complete search history.

(56) References Cited

U.S. PATENT DOCUMENTS

| | | |
|---|---|---|
| 6,921,133 B2 | 7/2005 | Taoka et al. |
| 8,308,235 B2 | 11/2012 | Ellison et al. |
| 2012/0049604 A1* | 3/2012 | Ellison ............... B60N 2/70 297/452.18 |
| 2018/0272909 A1* | 9/2018 | Misono ............... B60N 2/686 |
| 2019/0126878 A1* | 5/2019 | Fukawatase ......... B60R 21/207 |
| 2019/0193609 A1* | 6/2019 | Ando ................. B60N 2/4214 |
| 2020/0122610 A1* | 4/2020 | Tanaka .............. B60N 2/4279 |

FOREIGN PATENT DOCUMENTS

| | | | | |
|---|---|---|---|---|
| CN | 201890166 U | | 7/2011 | |
| DE | 102005027911 a1 | * | 12/2006 | ........ B60N 2/42763 |
| DE | 102018106897 a1 | * | 9/2019 | ........ B60N 2/42718 |
| EP | 2123507 B1 | | 5/2016 | |
| JP | 2009280050 A | * | 12/2009 | ........ B60N 2/42718 |
| JP | 2011157049 A | | 8/2011 | |
| WO | WO-2013094027 A1 | * | 6/2013 | ........ B60N 2/4221 |

* cited by examiner

*Primary Examiner* — Timothy J Brindley
(74) *Attorney, Agent, or Firm* — David Coppiellie; Price Heneveld LLP (57) ABSTRACT

A vehicle seating assembly includes a cushion supported by a seat frame and a retention device disposed laterally through the cushion in front of a predetermined H-point so as to be able to restrain a seated occupant. The retention device is selectively deployable from a design position to a deployed position in response to a sudden deceleration of a vehicle.

16 Claims, 7 Drawing Sheets

RETENTION DEVICE FOR VEHICLE SEAT

FIELD OF THE DISCLOSURE

The present disclosure generally relates to a vehicle seating assembly, and more specifically to a vehicle seating assembly designed to regulate the position of a seating assembly occupant during a sudden vehicle deceleration.

BACKGROUND OF THE DISCLOSURE

Seating assembly features that limit movement of an occupant may be desirable.

SUMMARY OF THE DISCLOSURE

According to a first aspect of the present disclosure, a vehicle seating assembly includes a cushion supported by a seat frame and a retention device disposed laterally through the cushion in front of a predetermined H-point so as to be able to restrain a seated occupant. The retention device is selectively deployable from a design position to a deployed position in response to a sudden deceleration of a vehicle.

Embodiments of the first aspect of the disclosure can include any one or a combination of the following features:
- the retention device is disposed above the seat frame in the design position;
- the retention device abuts the seat frame in the deployed position;
- the retention device includes an elongated loop including two substantially parallel segments that extend laterally through the cushion;
- the elongated loop includes a first engagement member and a second engagement member, wherein the first engagement member is disposed above a first longitudinal seat frame member in the design position, and wherein the second engagement member is disposed above a second longitudinal seat frame member in the design position;
- the first engagement member abuts the first longitudinal seat frame member in the deployed position and wherein the second engagement member abuts the second longitudinal seat frame member in the deployed position;
- the retention device is selectively deformable between a first shape in the design position and a second shape in the deployed position;
- the retention device includes a first length in the design position and a second length in the deployed position;
- the retention device includes a center portion disposed between the first engagement member and the second engagement member and wherein a first joint and a second joint are disposed between the center portion and the respective first and second engagement members;
- the first joint and the second joint comprise a first width in the design position and a second width in the deployed position and wherein the second width is greater than the first width;
- the first and second engagement members include respective first and second outboard portions, and wherein the first and second outboard portions engage outer walls of the respective first and second seat frame members in the deployed position;
- one or more of the first and second joints include graduated steps;
- the first engagement member abuts a first seat pan arm in the deployed position and wherein the second engagement member abuts a second seat pan arm in the deployed position; and/or
- a method of manufacturing the vehicle seating assembly of claim 3, comprising the steps of: providing a mold for forming a cushion that encloses a cavity in a closed condition; positioning the retention device in the cavity of the mold; and injection molding foam into the cavity to form a cushion that surrounds the retention device.

According to a second aspect of the present disclosure, a vehicle seating assembly includes a seat with a foam cushion. First and second longitudinal seat frame members are disposed below the foam cushion and on opposing sides of the foam cushion. A retention device extends through the foam cushion and above the first and second longitudinal seat frame members. The retention device is movable between a design position and a deployed position in response to a force exerted on the retention device. The retention device abuts the first and second longitudinal seat frame members in the deployed position.

Embodiments of the second aspect of the disclosure can include any one or a combination of the following features:
- the first and second longitudinal seat frame members comprise first and second seat pan arms;
- a first buffer is disposed between a first engagement member of the retention device and a the first seat pan arm and wherein a second buffer is disposed between a second engagement member of the retention device and a second seat pan arm; and/or
- the first and second buffers have a first height when the retention device is in the design position and wherein the first and second buffers have a second height when the retention device is in the deployed position.

According to a third aspect of the present disclosure, a seating assembly includes a seat with a retention device in a deformable member disposed above a seat frame. During exertion of a first or second occupant force on the deformable member, the retention device moves from a first position to a second position abutting the seat frame and retention device joints stretch from a first to a second width.

Embodiments of the third aspect of the disclosure can include the following feature:
- the retention device comprises a wire disposed in the deformable member.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
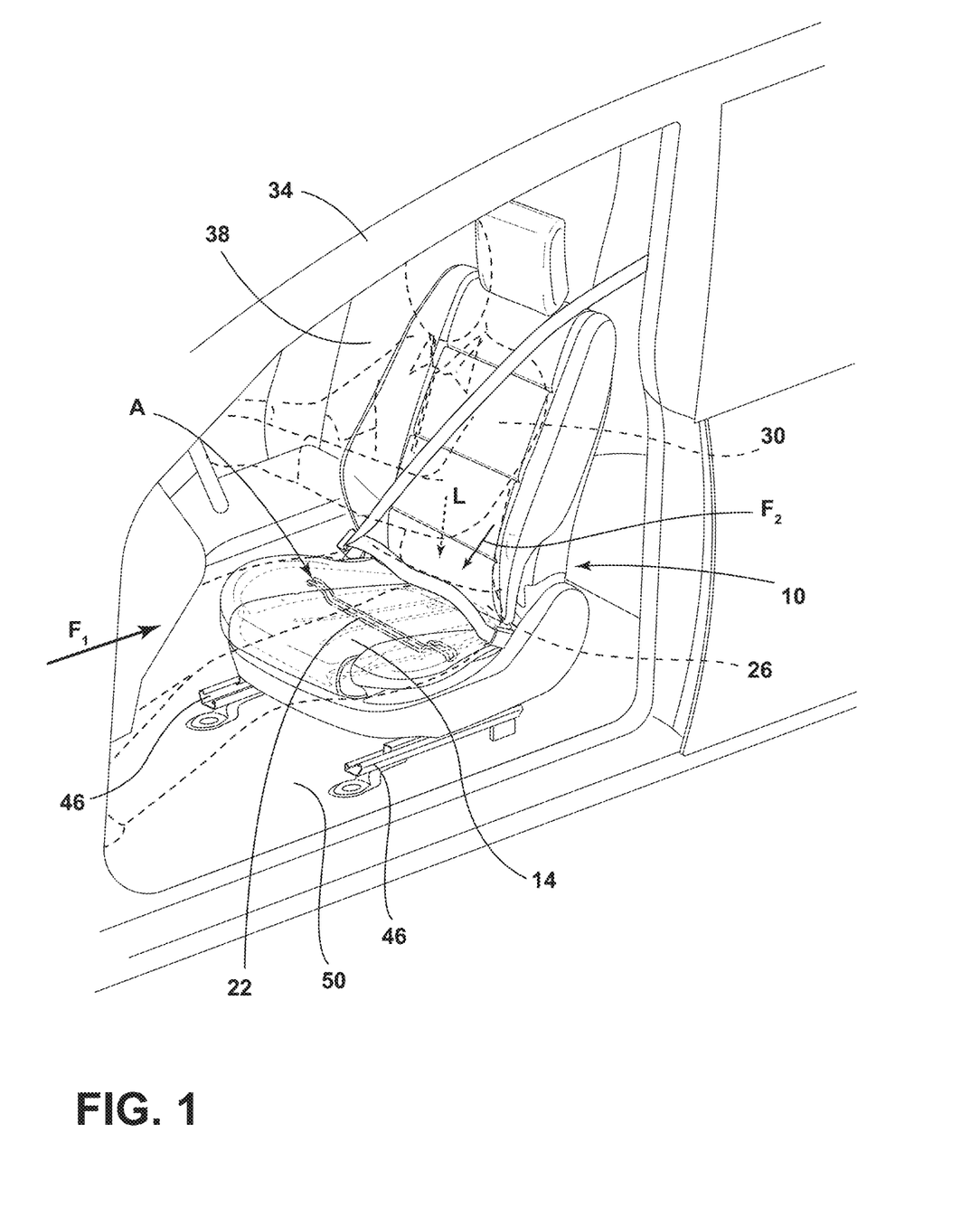
FIG. 1 is a perspective view of a portion of a vehicle interior having a seating assembly with a retention device in the design position.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the vehicle seating assembly described below and shown in the attached figures, a vehicle seating assembly may be described from the vantage point of an occupant seated in the seating assembly. The side of a seating assembly disposed on a right side of a seated occupant may be referred to as a right side or a first side of the seating assembly. The side of a seating assembly disposed on a left side of a seated occupant may be referred to as a left side or a second side of the seating assembly.

With reference to FIGS. 1-10, a vehicle seating assembly 10 includes a cushion 14 supported by a seat frame 18. A retention device 22 is disposed laterally through the cushion 14 and in front of the hips 26 of a seated occupant 30. The retention device 22 is selectively deployable from a design position A to a deployed position B in response to a sudden deceleration (represented by $F_1$ in FIG. 1) of the vehicle 34.

With reference to FIG. 1, a portion of a vehicle interior 38 is shown. A seating assembly 10 is shown disposed in the vehicle interior 38. The seating assembly 10 may be disposed in a driver side seating assembly 10 location in the vehicle 34 or any other seating assembly 10 location in a vehicle 34. An occupant 30 is shown seated in the seating assembly 10. A seat belt 42 may secure the occupant 30 to the seating assembly 10. A retention device 22 may be disposed within a cushion 14 of the seating assembly 10. The retention device 22 may extend laterally across the cushion 14. The hips 26 of the occupant 30 may be located behind the retention device 22 in the design position A shown.

Figure 5:
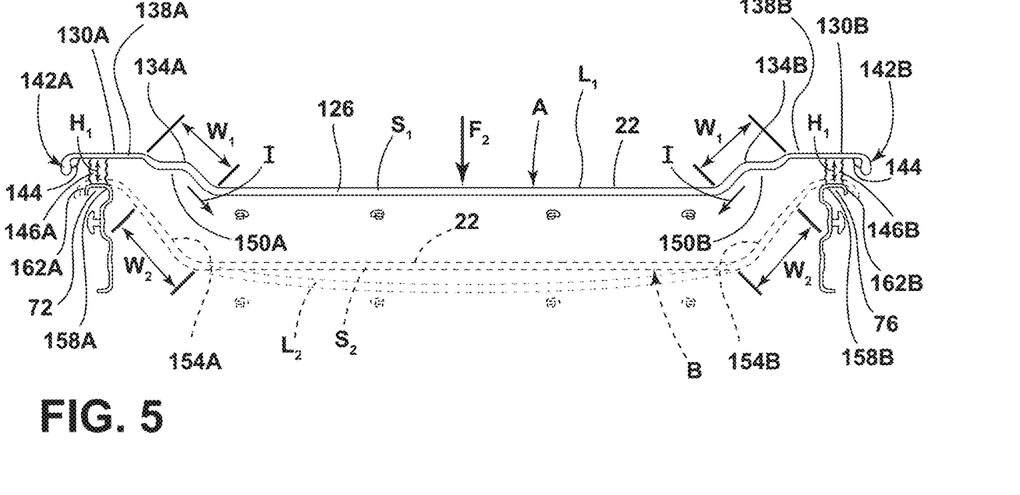
FIG. 5 is a cross-sectional view taken along V-V of FIG. 2 of a retention device in a design position and a deployed position.

With continued reference to FIG. 1, the seating assembly 10 may be disposed on rails 46 that may secure the seating assembly 10 to a vehicle floor 48. The seating assembly 10 may include a seat 50 and a seatback 52. The seat frame 18 may move in fore and aft directions along the rails 46. The weight of the seated occupant 30 may exert a load L on the retention device 22. The seating assembly 10 may be designed so that the retention device 22 is in a design position A when the load L of an occupant 30 is disposed on the seating assembly 10. When the vehicle 34 experiences a sudden deceleration of the vehicle 34 due to a dynamic event such as a front crash (as represented by force $F_1$), a force $F_2$ may be exerted on the occupant 30. The force $F_2$ may be exerted on the occupant 30 as a result of the force $F_1$ and the restraint of the occupant 30 in the seating assembly 10 by the seat belt 42. The force $F_2$ may cause the seated occupant 30 and the retention device 22 to move from the design position A (FIGS. 1, 2, 5, 6, 8-10) to the deployed position B (FIGS. 5, 7). As such, the retention device 22 in the deployed position B may catch the hips 26 of the occupant 30 and limit the distance that the occupant 30 may slide below the seat belt 42 and forward along the seat 50. Further, the retention device 22 in the deployed position B may transfer the force $F_2$ to the seat frame 18.

Figure 2:
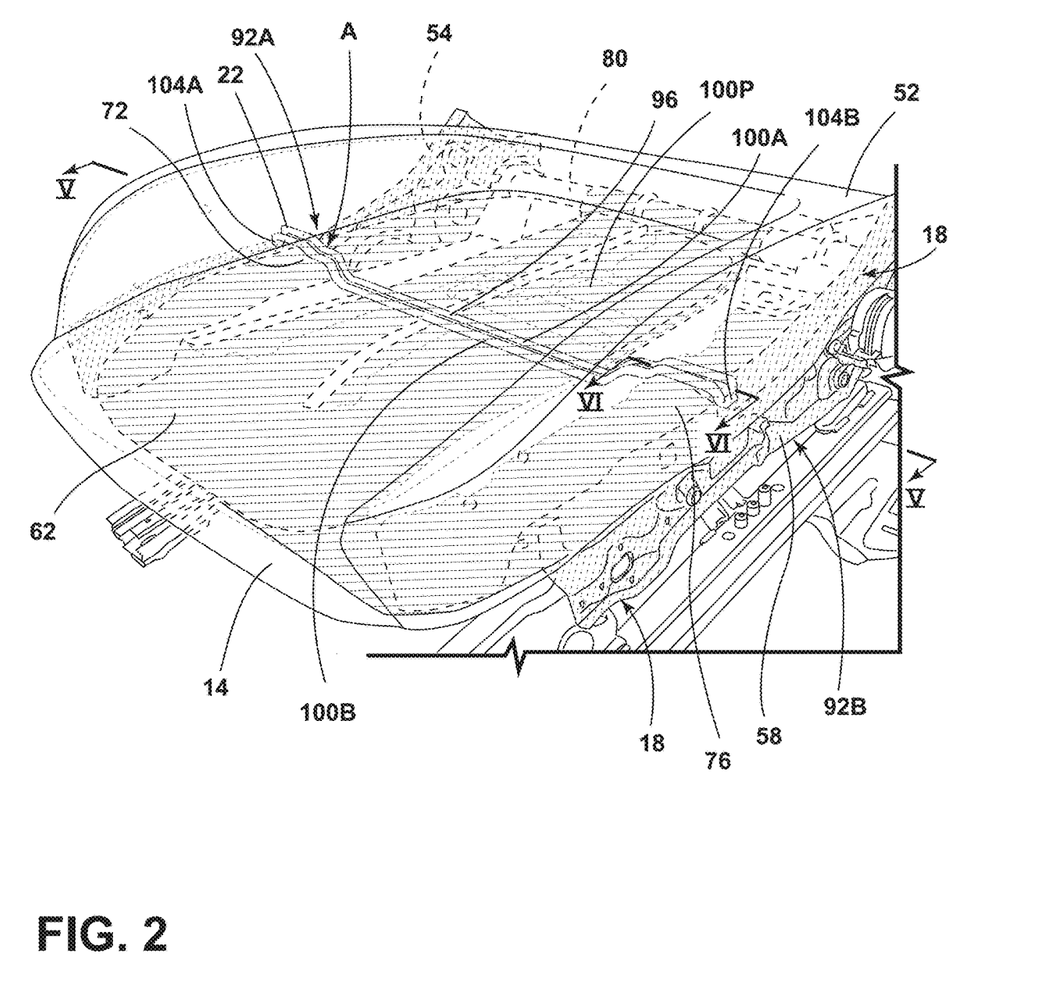
FIG. 2 is a perspective view of a portion of a vehicle seating assembly having a retention device in the design position.

Referring now to FIG. 2, the retention device 22 is shown disposed in a cushion 14. The cushion 14 is shown disposed on a seat frame 18. The seat frame 18 may include at least a first bracket 54, a second bracket 58, and a seat pan 62 coupled to the first and second brackets 54, 58. The seat pan 62 may include a base portion 68 disposed between the first seat pan arm 72 and the second seat pan arm 76. The base portion 68 may support the forward portion of the cushion 14. The first bracket 54 may be configured to receive a first seat pan arm 72. The second bracket 58 may be configured to receive a second seat pan arm 76. Thus, the first and second brackets 54, 58 may support the seat pan 62. In various examples, the seat pan 62 may be configured to pivot about a cross member 80 of the seat 50. In various examples, the seat pan 62 may be configured to pivot around pin receiving apertures 84 disposed on the first arm 72 of the seat pan 62 and the second arm 76 of the seat pan 62. The pin receiving apertures 84 (FIGS. 8-10) may receive pins 88 that secure the seat pan 62 to the first bracket 54 and the second bracket 58. The term first longitudinal seat frame member 92A may refer to the first bracket 54 and the first seat pan arm 72. The term second longitudinal seat frame member 92B may refer to the second bracket 58 and the second seat pan arm 76. A seatback 52 may be rotatably coupled to the seat frame 18. The seatback 52 may rotate about the cross member 80 of the seating assembly 10.

With reference again to FIG. 2, the retention device 22 is shown in the design position A. In the design position A, the retention device 22 may be disposed above the seat frame 18. The retention device 22 may include an elongated loop 96. The elongated loop 96 may be defined by two substantially parallel segments 100A, 100B that may extend laterally across the cushion 14 and two substantially parallel segments 104A, 104B that may extend longitudinally along the first and second longitudinal seat frame members 92A, 92B.

Figure 3:
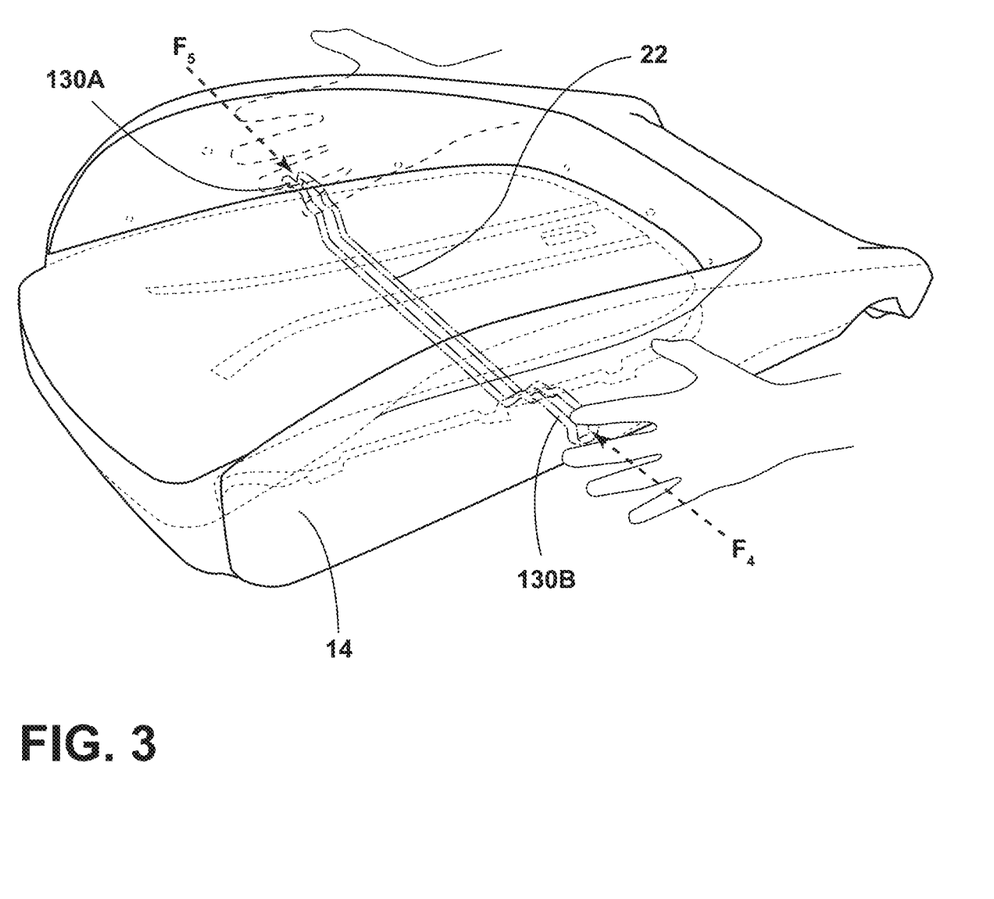
FIG. 3 is a perspective view of a cushion having a retention device in the cushion.
Figure 4:
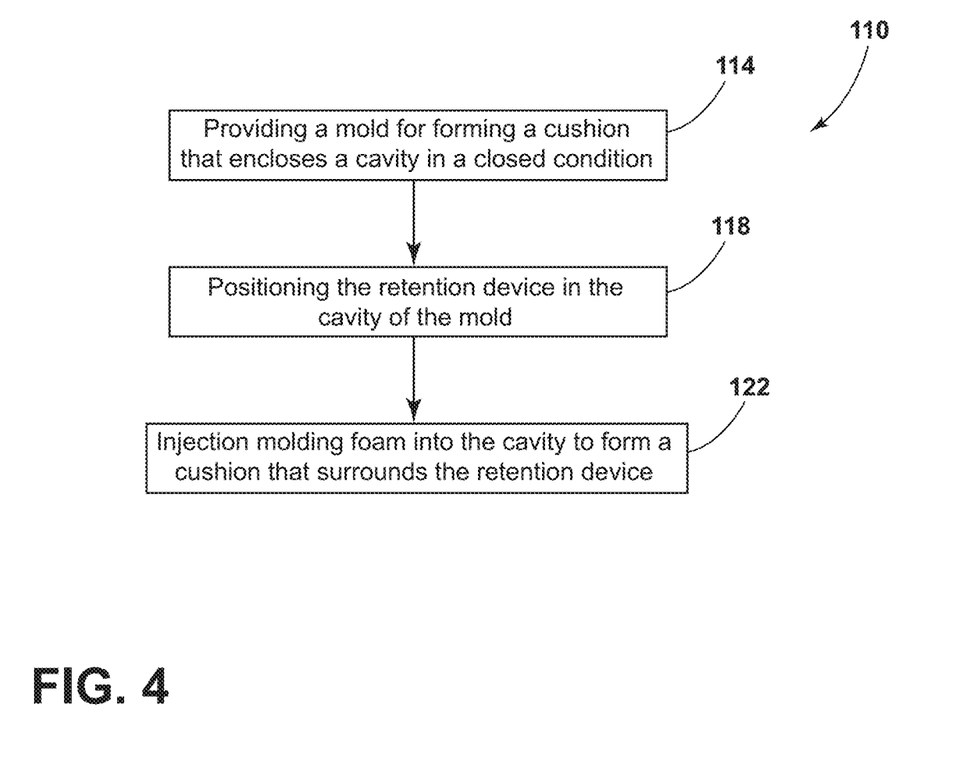
FIG. 4 is a flow diagram illustrating the method of manufacturing a cushion with a retention device disposed in the cushion.

With reference to FIG. 3, the retention device 22 is shown disposed in the cushion 14. The cushion 14 may be molded around the retention device 22 during the manufacturing process of the cushion 14. As shown in FIG. 4, the method of manufacturing the cushion 14 may include several steps. One step (shown by arrow 114) may include providing a mold 110 for forming a cushion 14 that encloses a cavity in a closed condition. Another step (shown by arrow 118) may include positioning the retention device 22 in the cavity of the mold. Another step (shown by arrow 122) may include injection molding foam into the cavity to form a cushion 14 that surrounds the retention device 22.

With reference to FIGS. 3-4, a cushion 14 may surround the center portion 126 of the retention device 22 and the first and second engagement members 130A, 130B of the retention device 22. The first engagement member 130A may be detectable by a force $F_3$ exerted on a first side of the cushion 14. Similarly, the second engagement member 130B may be detectable by a force $F_4$ exerted on a second side of the cushion 14. In one example, the first engagement member 130A may be detected by a tactile touch of the first engagement member 130A through foam disposed over the first engagement member 130A at the outboard side of the cushion 14. Similarly, the second engagement member 130B may be detectable by a tactile touch of the second engagement member 130B through foam disposed over the second engagement member 130B at the outboard side of the cushion 14. In various examples, portions of the first and second engagement members 130A, 130B may extend outside of the cushion 14. In various examples, the center portion 126 may include areas that are not covered by the cushion 14.

With reference to FIG. 5, a cross-sectional view of the retention device 22 is shown in the design position A and the deployed position B. The center portion 126 of the elongated loop 96 may be substantially horizontal. The first engagement member 130A may be disposed above the first seat pan arm 72 in the design position A. The second engagement member 130B may be disposed over the second seat pan arm 76 in the design position A. A first joint 134A may be disposed between the center portion 126 and the first engagement member 130A. A second joint 134B may be disposed between the center portion 126 and the second engagement member 130B. The first engagement member 130A may include a first substantially horizontal portion 138A and a first outboard portion 142A. The first outboard portion 142A may be substantially vertical. The second engagement member 130B may include a second substantially horizontal portion 138B and a second outboard portion 142B. The second outboard portion 142B may be substantially vertical. Bend angles 144 of approximately 90 degrees may be disposed between the first substantially horizontal position 138A and the first outboard portion 142A and between the second substantially horizontal portion 138B and the second outboard portion 142B.

Referring again to FIG. 5, first and second seat pan arms 72, 76 are shown disposed below the first and second engagement members 130A, 130B of the retention device 22. In the design position A, the first and second engagement members 130A, 130B may be disposed above the first and second seat pan arms 72, 76. In the design position A, the first and second joints 134A, 134B of the retention device 22 may have first widths $W_1$. In the design position A, the retention device 22 may have a first shape $S_1$. In the design position A, the retention device 22 may have a first length $L_1$. In the design position A, a first foam buffer 146A may be disposed between the first engagement member 130A and the first seat pan arm 72. In the design position A, the first foam buffer 146A may be minimally compressed and may have a first height $H_1$. In the design position A, a second foam buffer 146B may be disposed between the second engagement member 130B and the second seat pan arm 76. In the design position A, the second foam buffer 146B may be minimally compressed and may have a first height $H_1$.

With continuing reference to FIG. 5, the retention device 22 is also shown in a deployed position B. As previously explained, when a first force $F_1$ (FIG. 1) acts on a vehicle 34 due to a sudden deceleration or a dynamic event such as a front impact, then a resultant force $F_2$ may be disposed on a seated occupant 30. Due to a seat belt 42 or other restraint that maintains a designated hip position of the occupant 30 during standard driving conditions, the occupant 30 may be forced below the seat belt 42 and forward of the seat belt 42 during a sudden deceleration or a dynamic event such as a front impact (as represented by first force $F_1$ in FIG. 1). The retention device 22 and the occupant 30 may move from the design position A to the deployed position B at the outset of a sudden deceleration or a dynamic event such as a front impact (represented by $F_1$). The retention device 22 may be generally stationary at the deployed position B to minimize the movement of the occupant 30 forward along the seat 50 and into the seat 50 after a sudden deceleration or a dynamic event such as a front impact (represented by $F_1$). As such, the retention device 22 may work to minimize injuries to an occupant 30 from moving forward on the seat 50 and into the seat 50 during a sudden deceleration or a dynamic event such as a front impact (represented by arrow $F_1$). The retention device 22 may also absorb the force ($F_2$) of the displaced occupant 30 and transfer the force to the first and second longitudinal seat frame members 92A, 92B. During a sudden deceleration or a dynamic event such as a front impact (represented by $F_1$), the retention device 22 may move from the design position A to the deployed position B before a seat belt 42 equipped with a pre-tensioner may fully tension in response to the sudden deceleration or dynamic event such as a front impact (represented by $F_1$). Thus, the seat belt 42 may interact with the hip 26 of the occupant 30 when the hip 26 of the occupant 30 is at the H-point (hip point) or sufficiently close to the H-point. As such, injuries to an occupant 30 may be minimized.

The retention device 22 may be disposed in the cushion 14 at a predetermined location relative to the hip-point (H-point) of the occupant 30 of the seat 50. During a sudden deceleration or dynamic event such as a vehicle impact (represented by $F_1$), it may be desirable to maintain the H-point of a seated occupant 30. The H-point may be set at a predetermined location for purposes of safety during a sudden deceleration or dynamic event such as a vehicle impact (represented by $F_1$). When designing vehicle seating assemblies 10, design parameters may require that the H-point of a mannequin be aligned with the predetermined H-point for a particular vehicle seating assembly 10 in a vehicle 34. Adherence to a predetermined H-point may be a legal and a practical requirement which directly affects a crash restraint of an occupant 30 during a sudden deceleration or dynamic event such as a vehicle impact (represented by $F_1$). The H-point may position the head of an occupant 30 at an appropriate position relative to the head restraint on the vehicle seating assembly 10 and relative to the roof of the vehicle 34. The H-point may also position the hips 26 of an occupant 30 at an appropriate position relating to a seat belt 42 or other lap restraint. Accordingly, the H-point may be an important parameter for vehicle seating assembly 10 safety.

Referring again to FIG. 5, in the deployed position B, the first engagement member 130A may abut the first seat pan arm 72, and the second engagement member 130B may abut the second seat pan arm 76. As the retention device 22 moves from the design position A to the deployed position B, the first foam buffer 146A and the second foam buffer 146B may be compressed from a first height $H_1$ to a second height $H_2$. The second height $H_2$ may be negligible. In some instances, the retention device 22 may break the foam so that the retention device 22 may be in direct contact with the first seat pan arm 72 and/or the second seat pan arm 76 in the deployed position B. In some instances, in the deployed position B, a compressed layer of foam may be disposed between the retention device 22 and the first seat pan arm 72 and/or the second seat pan arm 76. The compressed layer of foam may be a continuous or non-continuous layer. For example, a non-continuous layer may have a tear or a split in the foam that may result from the movement of the retention device 22 between a design position A and a deployed position B.

With continued reference to FIG. 5, in the deployed position B, the first and second joints 134A, 134B of the retention device 22 may have second widths $W_2$. The first and second joints 134A, 134B may each include graduated steps 150A, 150B that are disposed between the center portion 126 of the retention device 22 and the respective first and second engagement members 130A, 130B of the retention device 22. In the design position A, the first and second joints 134A, 134B may include first and second graduated steps 1500A, 150B. In the deployed position B, the first and second graduated steps 150A, 150B may stretch to become first and second substantially linear portions 154A, 154B. As the retention device 22 moves from the design position A to the deployed position B, the first and second graduated steps 150A, 150B stretch in a direction shown by arrow I to form first and second substantially linear portions 154A, 154B. As such, a first width $W_1$ of the first and second joints 134A, 134B in the design position A may be less than a second width $W_2$ of the first and second joints 134A, 134B in the deployed position B. As such, the retention device 22 may include a first shape $S_1$ in the design position A and a second shape $S_2$ in the deployed position B. In various examples, the joints 134A, 134B may include various configurations that provide for extension of the joints 134A, 134B from a first width $W_1$ to a second width $W_2$ as the retention device 22 moves from the design position A to the deployed position B. These configurations may include a zig-zag configuration, a coiled configuration, and other configurations.

Figure 6:
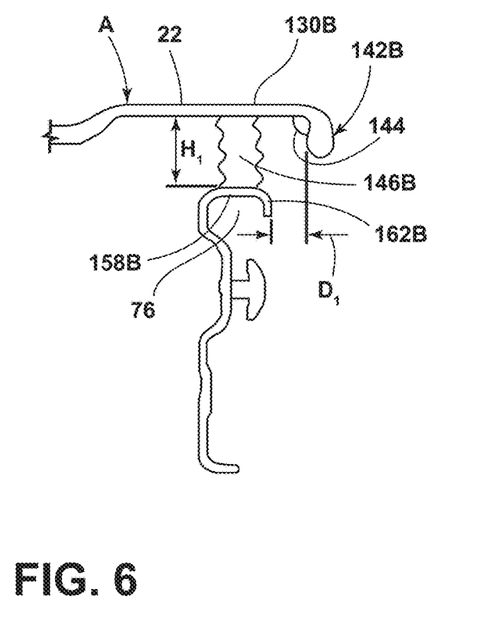
FIG. 6 is a cross-sectional view taken along VI-VI of FIG. 2 of a second engagement member of a retention device in the design position.
Figure 7:
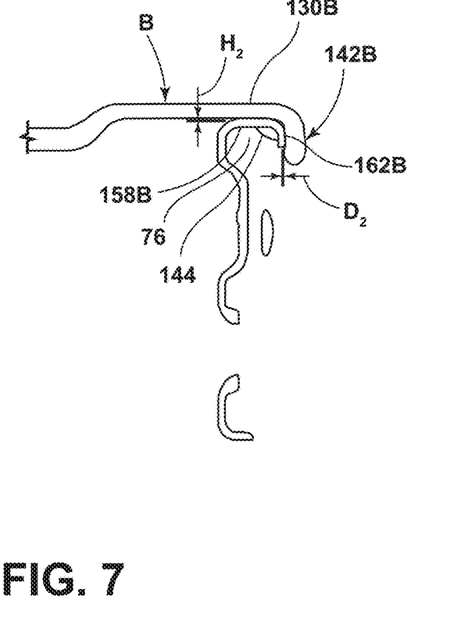
FIG. 7 is cross-sectional view of the second engagement member of a retention device of FIG. 6 in a deployed position.

Referring now to FIGS. 5-7, the manner in which the first and second engagement members 130A, 130B move during deployment from the design position A to the deployed position B is shown. FIGS. 6 and 7 show the second engagement member 130B of the retention device 22 and the second seat pan arm 76 in the design position A (FIG. 6) and the deployed position B (FIG. 7). The first seat pan arm 72 may include a first substantially horizontal portion 158A and a first outer wall portion 162A. A bend angle 144 of approximately 90 degrees may be disposed between the first substantially horizontal portion 158A and the first outer wall portion 162A. Similarly, the second seat pan arm 76 may include a second substantially horizontal portion 158B and a second outer wall portion 162B. A bend angle 144 of approximately 90 degrees may be disposed between the first substantially horizontal portion 158A and the second outer wall portion 162B.

With continued reference to FIGS. 5-7, in the design position A, a distance $D_1$ may be disposed between the first outboard portion 142A of the first engagement member 130A and a first outer wall portion 162A of the first seat pan arm 72. Similarly, in the design position A, a distance $D_1$ may be disposed between the second outboard portion 142B of the second engagement member 130B and a second outer wall portion 162B of the second seat pan arm 76. When the retention device 22 is in the deployed position B, the distance $D_2$ between the first outboard portion 142A of the retention device 22 and the first outer wall portion 162A of the first seat pan arm 72 may be less than distance $D_1$. Similarly, when the retention device 22 is in the deployed position B, the distance $D_2$ between the second outboard portion 142B of the retention device 22 and the second outer wall portion 162B of the second seat pan arm 76 may be less than distance $D_1$. In the example shown, in the deployed position B, the first outboard portion 142A may abut the first outer wall portion 162A of the first seat pan arm 72, and the second outboard portion 142B may abut the second outer wall portion 162B of the second seat pan arm 76. In various examples, in the deployed position B, foam or another material may be disposed between the first and second outboard portions 142A, 142B of the retention device 22 and the first and second outer walls 162A, 162B of the first seat pan arm 72 and the second seat pan arm 76, respectively.

With further reference to FIGS. 4-6, the elongated loop 96 may be made of an American Society of Testing and Materials (ASTM) 1010 steel wire, an ASTM 1018 steel wire, or other mild steel. The steel may stretch when subjected to a force $F_2$. As such, in some exemplary uses, the length of the retention device 22 may stretch from a first length $L_1$ in the design position A to a second length $L_2$ in the deployed position B.

Figure 8:
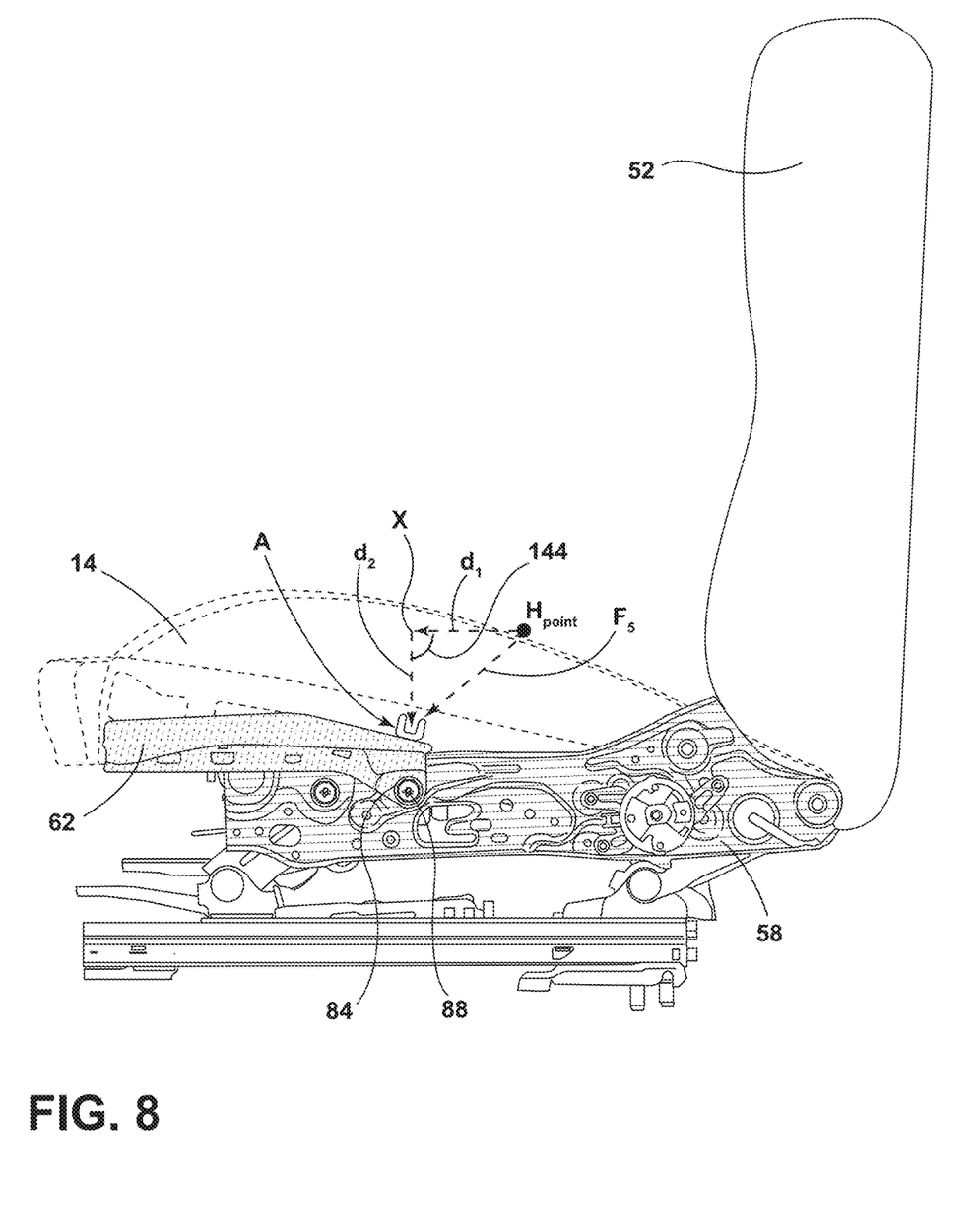
FIG. 8 is a left side elevational view of a seat with a retention device in a design position.

Referring now to FIG. 8, the retention device 22 may be positioned in the cushion 14 at a predetermined location relative to the H-point of a seated occupant 30. FIG. 8 shows a side elevational view of the seating assembly 10. The retention device 22 is shown it the design position A. The position of the retention device 22 in the cushion 14 may be described as follows: a substantially horizontal line 170 may be drawn a distance $d_1$ from the H-point to a point X in the cushion 14; a substantially vertical line 174 may be drawn a distance $d_2$ from the point X in the cushion 14 to the retention device 22; and a bend angle 144 of approximately 90 degrees may exist between the substantially horizontal line 170 and the substantially vertical line 174. In the example shown, the distance $d_1$ may be in the approximate range of between approximately 60 millimeters and approximately 240 millimeters and ideally approximately 120 millimeters. In the example shown, the distance $d_2$ may be in the approximate range of between approximately 35 millimeters and approximately 240 millimeters and ideally approximately 70 millimeters. The distance ($d_1$, $d_2$) of the retention device 22 relative to the H-point of a seated occupant 30 may depend on variables such as the cushion 14 dimensions, the dimensions of a seating structure that may be used instead of the cushion 14, and other factors. The distances $d_1$ and $d_2$ and the corresponding numerical ranges provided may be exemplary for the configuration shown in FIG. 8. Generally, the retention device 22 may be in line with a force vector $F_5$ of a seated occupant 30 during a sudden deceleration or a dynamic event such as a front impact.

In various examples, the retention device 22 may be disposed in a deformable member that may include a cushion 14 or other deformable seat member. In various examples, the retention device 22 may be disposed in a seat member that may be minimally deformable. In various examples, the retention device 22 may be placed at various locations of a seat member that may be in line with a force vector $F_5$ of a seated occupant 30 during a sudden deceleration or dynamic event such as a front impact (represented by $F_1$).

Figure 9:
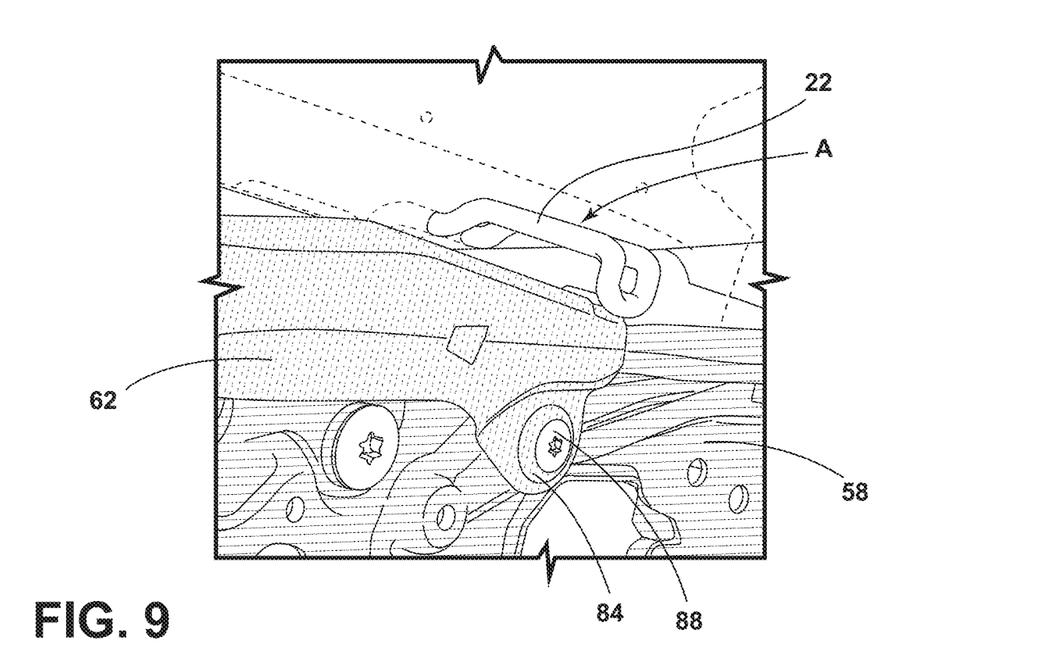
FIG. 9 is a left side perspective view of a portion of a seat with the retention device in a design position.

Referring now to FIG. 9, a perspective view is shown of a portion of the seat 50 and the retention device 22 in the design position A.

Figure 10:
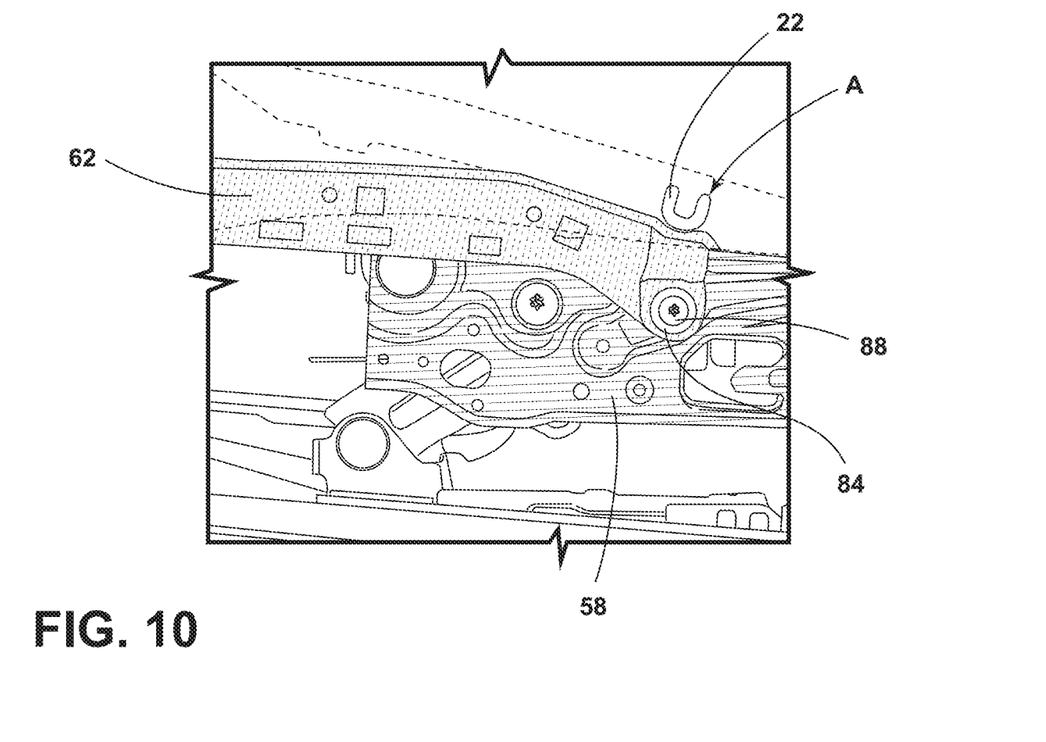
FIG. 10 is a left side elevational view of a portion of the seat with the retention device in a design position.

Referring now to FIG. 10, a side elevational view is shown of a portion of the seat 50 and the retention device 22 in the design position A.

In various examples, the elongated loop 96 of the retention device 22 may include fewer than or more than two substantially parallel segments (for example, 100A, 100B, 104A, and 104B). In various examples, the retention device 22 may be a shape such as a square tube, a rectangular tube, or another shape instead of an elongated loop 96. In various examples, the retention device 22 may include one or more wires molded into a seat frame.

A variety of advantages may be derived from use of the present disclosure. The retention device may be added to an existing cushion to interact with an existing seat frame and to serve an anti-submarining function. The retention device may be conveniently added to an existing cushion by molding the cushion around the retention device. As such, addition of a retention device to an existing seating assembly may be relatively economical.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a cushion supported by a seat frame; and
   a retention device disposed laterally through the cushion and in front of a predetermined H-point so as to be able to restrain a seated occupant;
   wherein the retention device is selectively deployable from a design position to a deployed position in response to a sudden deceleration of a vehicle;
   wherein the retention device is disposed above the seat frame in the design position; and
   wherein the retention device abuts the seat frame in the deployed position.

2. The vehicle seating assembly of claim 1, wherein the retention device includes an elongated loop including two substantially parallel segments that extend laterally through the cushion.

3. The vehicle seating assembly of claim 2, wherein the elongated loop includes a first engagement member and a second engagement member, wherein the first engagement member is disposed above a first longitudinal seat frame member in the design position, and wherein the second engagement member is disposed above a second longitudinal seat frame member in the design position.

4. The vehicle seating assembly of claim 3, wherein the first engagement member abuts the first longitudinal seat frame member in the deployed position and wherein the second engagement member abuts the second longitudinal seat frame member in the deployed position.

5. The vehicle seating assembly of claim 4, wherein the retention device is selectively deformable between a first shape in the design position and a second shape in the deployed position.

6. The vehicle seating assembly of claim 4, wherein the retention device includes a first length in the design position and a second length in the deployed position.

7. The vehicle seating assembly of claim 4, wherein the retention device includes a center portion disposed between the first engagement member and the second engagement member and wherein a first joint and a second joint are disposed between the center portion and the respective first and second engagement members.

8. The vehicle seating assembly of claim 7, wherein the first joint and the second joint comprise a first width in the design position and a second width in the deployed position and wherein the second width is greater than the first width.

9. The vehicle seating assembly of claim 8, wherein the first and second engagement members include respective first and second outboard portions, and wherein the first and second outboard portions engage outer walls of the respective first and second seat frame members in the deployed position.

10. The vehicle seating assembly of claim 9, wherein one or more of the first and second joints include graduated steps.

11. The vehicle seating assembly of claim 4, wherein the first engagement member abuts a first seat pan arm in the deployed position and wherein the second engagement member abuts a second seat pan arm in the deployed position.

12. A method of manufacturing the vehicle seating assembly of claim 1, comprising the steps of:
   providing a mold for forming a cushion that encloses a cavity in a closed condition;
   positioning the retention device in the cavity of the mold; and
   injection molding foam into the cavity to form a cushion that surrounds the retention device.

13. A vehicle seating assembly comprising:
   a seat including:
   a foam cushion;
   first and second longitudinal seat frame members disposed below the foam cushion and on opposing sides of the foam cushion;
   a retention device extending through the foam cushion and above the first and second longitudinal seat frame members;
   wherein the retention device is movable between a design position and a deployed position in response to a force exerted on the retention device; and
   wherein the retention device abuts the first and second longitudinal seat frame members in the deployed position.

14. The vehicle seating assembly of claim 13, wherein the first and second longitudinal seat frame members comprise first and second seat pan arms.

15. The vehicle seating assembly of claim 14, wherein a first buffer is disposed between a first engagement member of the retention device and a the first seat pan arm and wherein a second buffer is disposed between a second engagement member of the retention device and a second seat pan arm.

16. The vehicle seating assembly of claim 15, wherein the first and second buffers have a first height when the retention device is in the design position and wherein the first and second buffers have a second height when the retention device is in the deployed position.

* * * * *